United States Patent
Schill et al.

(10) Patent No.: US 7,937,913 B2
(45) Date of Patent: May 10, 2011

(54) DEVICE FOR CONSOLIDATING ITEMS INTO A SINGLE UNIT OF A PRE-DEFINED TOTAL WEIGHT

(75) Inventors: Joachim Schill, Kehl (DE); Hartmut Ilch, Kehl (DE)

(73) Assignee: MAJA—Maschinenfabrik Hermann Schill GmbH & Co. KG, Kehl-Goldscheuer (DE)

( * ) Notice: Subject to any disclaimer, the term of this patent is extended or adjusted under 35 U.S.C. 154(b) by 0 days.

(21) Appl. No.: 12/080,304

(22) Filed: Apr. 2, 2008

(65) Prior Publication Data

US 2009/0249749 A1    Oct. 8, 2009

(51) Int. Cl.
*B65B 1/32*      (2006.01)
*B65B 25/06*     (2006.01)
*B65B 37/18*     (2006.01)
*B26D 7/30*      (2006.01)

(52) U.S. Cl. .................. 53/502; 53/517; 53/244; 83/77

(58) Field of Classification Search .................. 53/435, 53/514, 502, 235, 517, 167, 244; 83/932, 83/77; *B65B 37/18, 25/06, 5/08; B26D 7/30*
See application file for complete search history.

(56) References Cited

U.S. PATENT DOCUMENTS

| | | | | |
|---|---|---|---|---|
| 3,995,517 A | * | 12/1976 | Smith | 83/77 |
| 4,548,107 A | * | 10/1985 | Marchese et al. | 83/77 |
| 4,868,951 A | * | 9/1989 | Akesson et al. | 83/367 |
| 5,054,345 A | * | 10/1991 | Weber | 53/435 |
| 5,205,367 A | * | 4/1993 | Andre et al. | 83/77 |
| 5,226,334 A | * | 7/1993 | Pegoraro | 83/932 |
| 5,787,776 A | * | 8/1998 | Nishimoto | 83/367 |
| 5,806,287 A | * | 9/1998 | Trechsel | 53/502 |
| 6,351,927 B1 | * | 3/2002 | Righele et al. | 53/435 |
| 6,407,818 B1 | * | 6/2002 | Whitehouse | 356/627 |
| 6,640,681 B1 | * | 11/2003 | Weber | 83/932 |
| 7,007,595 B2 | * | 3/2006 | Ozery et al. | 83/932 |
| 7,220,176 B2 | * | 5/2007 | Hartwick | 452/30 |
| 7,279,644 B1 | * | 10/2007 | Kasel | 53/502 |

(Continued)

FOREIGN PATENT DOCUMENTS

DE    32 49 609    1/1985

(Continued)

OTHER PUBLICATIONS

German Search Report dated May 18, 2006, for application DE 102005047796.8, 2 pages.

*Primary Examiner* — Stephen F Gerrity
(74) *Attorney, Agent, or Firm* — Shlesinger, Arkwright & Garvey LLP

(57) ABSTRACT

Proposed are a method and a device for consolidation of a number n of items, whose weight varies within predefined limits, in a container to a single unit with a predefined target weight. For this purpose, n−1 portions are combined and the weight of all of the n−1 portions is determined. Then the difference between the target weight of the n portions on the one hand and the weight of the n−1 portions on the other is determined. Ultimately, an $n^{th}$ portion with a precise weight is cut-off from a piece, where the weight equals the weight of the $n^{th}$ portion of the difference. For this purpose, the device is provided with a first and a second insertion station, a scale, a computer, and a portioning and cutting device.

17 Claims, 3 Drawing Sheets

U.S. PATENT DOCUMENTS

Figure 1:
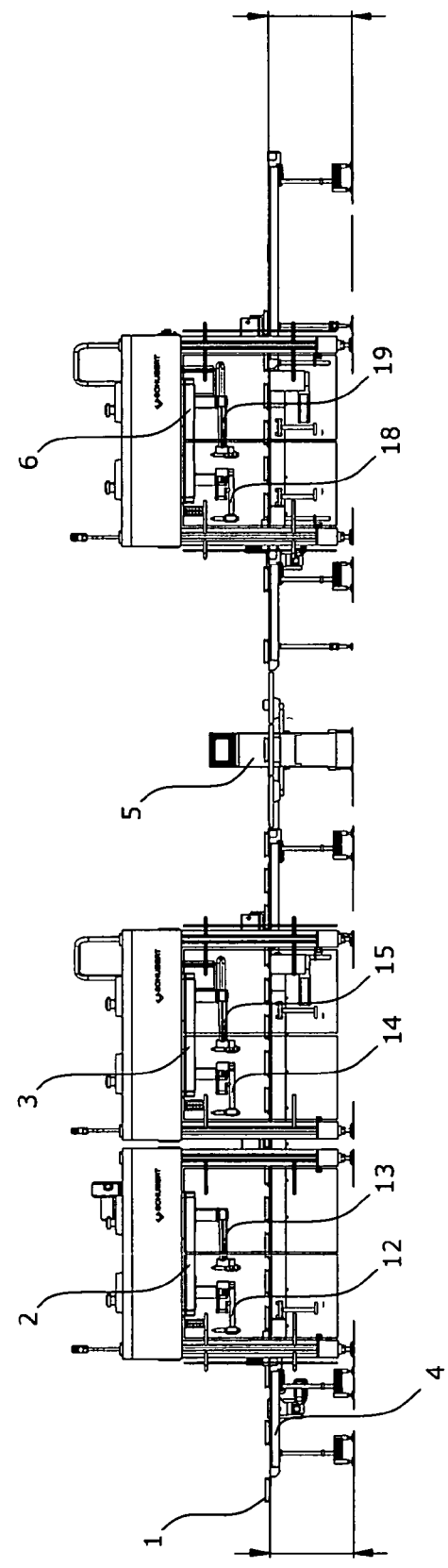

2006/0182603 A1 * 8/2006 Hawes .................. 414/735
2007/0202229 A1 * 8/2007 Nielsen ................. 426/518

FOREIGN PATENT DOCUMENTS

| DE | 102 30 653 | | 1/2004 |
|----|------------|---|--------|
| DE | 103 34 643 | | 3/2005 |
| DE | 10 2004 010 900 | | 9/2005 |
| DE | 102004056031 A1 * | | 5/2006 |
| DE | 10 2005 047 796 | | 4/2007 |
| GB | 2276950 A * | | 10/1994 |
| JP | 2006078469 A * | | 3/2006 |
| WO | 84/01927 | | 5/1984 |
| WO | 01/22043 | | 3/2001 |
| WO | 03/069285 | | 8/2003 |
| WO | WO 2004064529 A1 * | | 8/2004 |
| WO | WO 2006131151 A1 * | | 12/2006 |

* cited by examiner

DEVICE FOR CONSOLIDATING ITEMS INTO A SINGLE UNIT OF A PRE-DEFINED TOTAL WEIGHT

PRIOR ART

The invention is based upon a method and device for consolidating items whose weight varies within pre-defined limits and which are cut off from a larger piece in containers into a single unit of a pre-defined target weight.

In many industrial fields, several items are combined in packages. In the process, the packages filled with the items must satisfy special criteria. Among the criteria are for example the number of items per package and the total weight of all the items contained in the package. In the process, the total weight corresponds to the sum of the weights of all items contained in the package. The total weight must be the same in all packages and correspond to a pre-defined target weight. Packages using these criteria are, for example, those containing foodstuffs. These items include, for example, pieces or slices of meat, sliced sausage or cheese, portions of fresh or deep-frozen fish, or poultry. The portions are usually cut off or separated by machine from a larger piece at precise weights. In spite of improved techniques for cutting items at a precise weight, the total weight of these items can vary within pre-defined tolerances, so that the weight of the items varies. Even if the pre-defined tolerances for the weight of the individual items permit only small deviations from the pre-defined target weight, the random combination of a pre-defined number of items can result in a significant deviation from the desired total weight. The deviation from the desired total weight equals the sum of the individual deviations of the combined items.

The package must state the weight of the items it contains. The label of the pre-fabricated package states the target weight. For the protection of consumers, the total weight must not be less than the target weight stated on the package. If the total weight that is actually contained in the package exceeds the specified target weight, the result will be a loss for the manufacturer. It is therefore desirable that the total weight does not exceed the target weight or, at least, does not exceed by more than the smallest possible amount.

In practice, the items to be packaged are therefore weighed and manually combined as a function of the weight. This is labor-intensive and time-consuming and thus costly.

WO2003/069285 A3 from prior art discloses a method and device for the automated consolidation of several items into a single unit with a pre-defined total weight. In this process, the items are supplied to a scale via a conveyor. The weight is determined for each item. Several containers are arranged on the side of the conveyor. Each container is continuously weighed in order to determine the weight of the items deposited into the containers. Each of the items supplied on the conveyor is supplied to one of the containers via a guide arm as a function of the weight determined by the scale and the weight of the individual containers. In this process, the guide arm pushes the item from the conveyor into the container. A disadvantage of this device and the associated method is that there is only a small number of criteria available for assigning an item to one of the containers. The number of criteria corresponds to the number of the containers. If an item cannot be assigned to any of the containers on the basis of its weight, then it must be separated by the conveyor, because it will otherwise block the allocation of the subsequent items. In addition, a many scales must be provided. The number of scales equals the number of the containers plus one additional scale for the individual items. An additional disadvantage is that the items are deposited into the containers in random order. For packaging, the items must be removed from the containers and be deposited into a package in a pre-defined sequence. This requires additional process steps.

WO 2001/022043 discloses a method and a device for discarding added items by means of a scale and at least two robots. The items conveyed on a conveyor are weighed and are then assigned by a control unit to a receiving station based upon their weight. The items are picked up by at least two robots and deposited into the respective receiving station. A disadvantage is that when filling a container with a number N of items, the inaccuracy resulting from weighing the individual slices results in inaccuracy with respect to weight of the contents of entire container. In this instance, the inaccuracy of the container content equals the product of the inaccuracies of each item and the number of items per container. Because the container content must not be less than the stated target weight on the container, the consolidation of the items results in this case in an approximate 2% loss for the manufacturer. The inaccuracy when determining the weight results from the fact that the scale not only determines the weight of the item which is subsequently deposited in a receiving station, but also the weight of additional particles which are on the scale together with the item, but do not reach the receiving station. This can, for instance, involve impurities or small particles of the item which remain on the conveyor. A further disadvantage of the described method and the device is, that the number of items that are to be assigned to the different receiving stations, is limited. This again results in a limitation of the possibilities. This limitation is particularly relevant with respect to the last item to be deposited into a receiving station, since this item is particularly critical with respect to its weight in order to attain the target weight and minimize the loss for the manufacturer.

THE INVENTION AND ITS ADVANTAGES

In contrast, the method described by the invention has the advantage that the inaccuracy with respect to the total weight of a number n of items contained in the container is a function merely of the inaccuracy of the weight of the item which was last deposited into the container. A variation of the weight of the remaining items contained in the container has no influence on the total weight. Moreover, the items deposited into a container are not selected from an entirety of items but are instead continuously deposited and/or adjusted with respect to their weight. The items can advantageously be deposited into containers. It is also possible, however, to deposit the portions or items on a conveyor. Each container is filled with the items until only one more item is to be added. As an alternative, a group of n−1 portions are consolidated on a conveyor. In this process, the number n equals the number of portions that are to be consolidated into one package. The number n−1 is one portion less than the desired total number of portions in one package. If the final number of items in the container is n, the container is initially filled with n−1 items. The filling is done on one or more first insertion stations manually or by machine. The containers filled with n−1 items are advanced via a conveyor and are weighed. A computer calculates the difference between the desired target weight plus the weight of the empty container on the one hand, and the weight of the container filled with n−1 items as determined by the scale, on the other. The difference equals the weight of the last item which is to be filled into the container. An adjustable portioning and cutting unit is subsequently adjusted such that an item having a previously determined weight is cut off from a larger piece. At a second insertion station, the last item is then filled into the container manually, or by machine. Ultimately, the container filled with n items can be supplied for further processing, such as for packaging.

The portioning and cutting unit can be either a machine which solely separates the last portion to be added to each container, or a machine which in addition also cuts off the n−1 portions from a larger piece. What is essential is that the weight of the last portion equals as precisely as possible the weight which results from the weight of the n−1 portions and the desired target weight. In contrast thereto, the weight of the n−1 portions does not have to correspond so precisely to a pre-defined weight.

Due to the fact that merely the container filled with n−1 items is weighed, the inaccuracy of the total weight of the container filled with n items depends solely on the inaccuracy resulting from this weight determination and on the inaccuracy of the weight of the last slice. Because, during weighing of the container filled with n−1 items, no particles of the items remain on the scale, this weight determination is very precise. The accuracy of the weight of the last slice depends on how precisely the portioning and cutting device can be adjusted when the last item is cut off from a large piece.

The items can have the form of a slice, a cube, or an irregular shape, for example. The form is dependent on the larger piece from which the items are cut off as well as on the subsequent use of the items.

The container, can be a packaging container or a packaging bowl, for example, which, after it is completely filled with the items, needs only to be closed. In this case, the items do not have to be taken out of the container again after filling but can remain in the container for the final packaging process and further handling. The items can be deposited in the desired order at the first and second insertion station, for instance in a stack, fan-shaped, or as a Rosette. In addition there is the possibility that the containers will only be used for consolidation at a precise weight of a number n of items. For further processing, the items are subsequently removed again from the containers.

The weight of the n−1 items, which are deposited in a container sequentially or simultaneously, can vary within pre-defined limits. It must however not vary to the extent that the weight of the n−1 items already exceeds the desired target weight. The n−1 items can be cut off from a larger piece with a portioning and cutting device, for example, which is the equivalent of the portioning and cutting device for cutting off the last piece.

According to one advantageous embodiment of the invention, the scale provided is an in-line checkweigher which is arranged on the conveyor.

According to a further advantageous embodiment of the invention, the first or second insertion station is equipped with one or more grippers. The grippers pick up the items consecutively in the supplied sequence and insert them into a container. The grippers can, for example, be needle grippers, pincer grippers, finger grippers, shovel grippers, or suction grippers. The suction grippers can be based on vacuum generation, or on the venturi jet principle. In the latter case, air flows out of one or more jets. When the suction gripper approaches an item with a flat surface, the air or the gas emitted from the jet flows around the item and ensures that the item is sucked onto the gripper. In the process, the gripper does not touch the item.

According to, a further advantageous embodiment of the invention, the gripper is arranged on a rotating gripper arm. The rotation axis of the gripper arm runs perpendicular to the direction of motion of the conveyor. The conveyor can be a belt conveyor or a continuous chain conveyor. A gripper arm drive causes the gripper arm to rotate about its rotational axis. On the side of the conveyor, a plate is provided which can be pivoted around an axis parallel to the axis of the gripper arm. The rotating gripper arm guides the gripper to an item on the conveyor from behind and during its rotation pushes the item across the lateral edge of the conveyor onto the plate. Thereafter, the plate and the gripper arm are rotated together with the gripper about their common axes until the plate and the gripper are above the designated position of the item in a container. Then, the plate is pulled away from below the item at high speed. This results from a rotation of the plate in the direction opposite to that of the initial motion. In the process, the plate is returned to its initial position on the side of the conveyor. After the plate is pulled out, the item automatically drops of its own weight into the container below. If needed, a plunger can be provided which pushes the item from above into the container. The gripper remains in the position above the container until the item is located in the package and the plunger, if any, has been pulled back up. Subsequently, the gripper arm is rotated along with the gripper in order to pick up the next piece from the conveyor. In order to accelerate this process, the gripper arm can be equipped with two grippers. In such case, the rotational axis runs through the center of the gripper arm. The grippers are mounted on the two opposite ends of the gripper arm. The gripper preferably consists of two fingers of which one is fixed to the gripper arm and the other finger is connected to the gripper arm so that it can be shifted in a radial direction. When the gripper is brought close to an item resting on the conveyor, the two fingers are at the maximum possible distance from one another. After the gripper has detected the item, the articulated finger is brought close to the fixed finger on the gripper. This results in the item being picked up by the gripper with the same alignment in which it rests upon the conveyor. When the two fingers are brought close to each other, the item can no longer change its orientation relative to the gripper. This also ensures that the item is picked up and shifted by the gripper irrespective of its position on the conveyor, its alignment, and its size.

In addition, the gripper can be located on a gripper arm, the end of which that is facing away from the gripper is attached above or on the side of the conveyor such that it fixed in place, shiftable, or pivotable. In the process, the gripper arm can be moved about at least two axes. A gripper of this type is suitable for picking up items from the conveyor from above and lifting them. The picked up item is also transferred to and deposited into the container from above.

According to a further advantageous embodiment of the invention, a sensor is provided on the conveyor to detect when an item passes by a pre-defined position on the conveyor. This event is transmitted to a control unit on the insertion station. The control unit ensures that the insertion station picks up the detected item from the conveyor. In addition, it is possible to detect the position of the items on the conveyor with an image processor. For this purpose, an electronic camera is located above the conveyor. The pictures taken by the camera are fed into and analyzed by the electronic image processor. The position determined from these data and the alignment, if necessary, as well as the size of the items are then transmitted to the control unit of the insertion station.

According to a further advantageous embodiment of the invention, the first and/or second insertion station(s) are/is equipped with an industrial robot. This robot is provided with kinematics, a control system, a drive, a position measuring system, and a sensoring system.

According to a further advantageous development of the invention, a portioning and cutting device is provided which has an oblong insertion chamber for inserting a large piece from which individual items can be cut off. The insertion chamber is provided with a piston for compressing the piece and for advancing it axially incrementally or continuously. A portioning unit on the end of the insertion chamber facing away from the piston is arranged so that it can be rotated about an axis. The portioning unit has one or more portioning chambers. For this purpose, the floor of the portioning chamber facing away from the insertion chamber is movable. A mechanical gear unit or a drive ensures that the chamber bottom moves towards or away from the insertion chamber. A knife is provided between the insertion chamber and the portioning unit. The knife is either rotated by a drive or moved with a linear reciprocating motion. In order to cut off an item with a pre-defined weight from a larger piece inserted into the insertion chamber, such as a piece of meat, the chamber bottom of the portioning chamber is adjusted such that the volume of the portioning chamber which is open towards the insertion chamber predetermines the weight, if the density of the larger piece or the items is known. In this regard, it is assumed that the volume of the portioning chamber will be completely filled by a section of the piece. For this purpose, the piston pushes the piece in the insertion chamber in the direction of the portioning chamber arranged in the extension of the insertion chamber. The cross-sections of the insertion chamber and the portioning chamber are equal. During portioning, the portioning chamber is arranged in the extension of the insertion chamber. In order to ensure that the piece in the insertion chamber is pressed such that no voids can be formed, plungers or shiftable walls can be provided on the side of the insertion chamber. As soon as a section of the piece completely fills the portioning chamber, the knife that is located between the insertion chamber and the portioning chamber and/or the portioning unit is moved. In the process, the section in the portioning chamber is cut off from the remaining piece in the insertion chamber. Then, the portioning unit is rotated so that the portioning chamber with the separated section is no longer located in the extension of the insertion chamber. In this position, the opening of the portioning chamber is open and the separated section can be ejected from the portioning chamber. This section is the last item that is inserted into a container which is already filled with n−1 items. A precondition for the portioning and tracking device mode of operation is that the piece from which the individual items are cut off has a consistency which permits compression in the insertion chamber and portioning chamber. This requires a certain elasticity.

Several portioning chambers can be arranged in the portioning unit. In this manner, the next item can already be portioned while a previously separated item is being ejected.

The difference between the target weight and the weight of an empty container determined by the computer, on the one hand, and the weight of a container filled with n−1 items as determined by the scale, on the other, is transmitted to a control unit. The control unit ensures that the chamber bottom of the portioning chamber is adjusted such that the determined weight results from the volume of the portioning chamber and the known density of the items.

According to a further advantageous embodiment of the invention, a second scale is provided which determines the weight of the container filled with a number n of items. A control unit subsequently compares this weight with the sum of the target weight and the weight of the empty container and corrects the adjustment of the portioning and cutting device, if it exceeds a specific tolerance range. A deviation outside of the tolerance range can for example result from the variation in the density of the piece from which the items are cut off. This can be taken into account during the following cutting processes.

According to a further advantageous embodiment of the invention, a scale for determining the weight of a larger piece and a portioning and cutting device for cutting up the piece into individual items are provided upstream of the first insertion station. Using the weight of the piece and the weight of the individual items, which can vary within pre-defined limits, a computer calculates an integer number of items as well as the associated weight of the items. Thereafter, the portioning and cutting device is adjusted such that the piece is cut up into the calculated number of items having the calculated weight. The advantage of this device is that the entire piece can be used and that no waste or leftovers are generated during cutting.

According, to an advantageous embodiment of the method described by the invention, initially the weight of the piece is determined from which the individual portions are to be cut off. Then, using this weight and the desired target weight of the individual portions as well as a pre-defined tolerance range hereto, the integer number of portions or items is determined into which the item can be divided. Thereafter, the piece is divided apportioned into the calculated number of pieces. Then, an n−1 number of these portions or items are inserted into a container, which is weighed after filling. Using the difference of the weight of the weighed container and the target weight, the weight of the last portion is calculated. A portion having this weight is cut up from a larger piece and inserted into the container. This method has the advantage that no leftovers remain from the pieces when they are cut up into individual portions. Such leftovers cannot be filled into the containers. They are thus rejects.

Further advantages and advantageous embodiments of the invention can be found in the subsequent description, the drawing, and the claims.

DRAWING

The drawing shows an embodiment of the invention. This embodiment is described in detail below. The figures depict the following FIG. 1: Device for consolidating a number n of items, as a side view FIG. 2: Device as in FIG. 1, as a plan view, FIG. 3: Device as in FIG. 1, without insertion stations and without portioning and cutting device, as a perspective view.

DESCRIPTION OF THE EMBODIMENT

Figure 2:
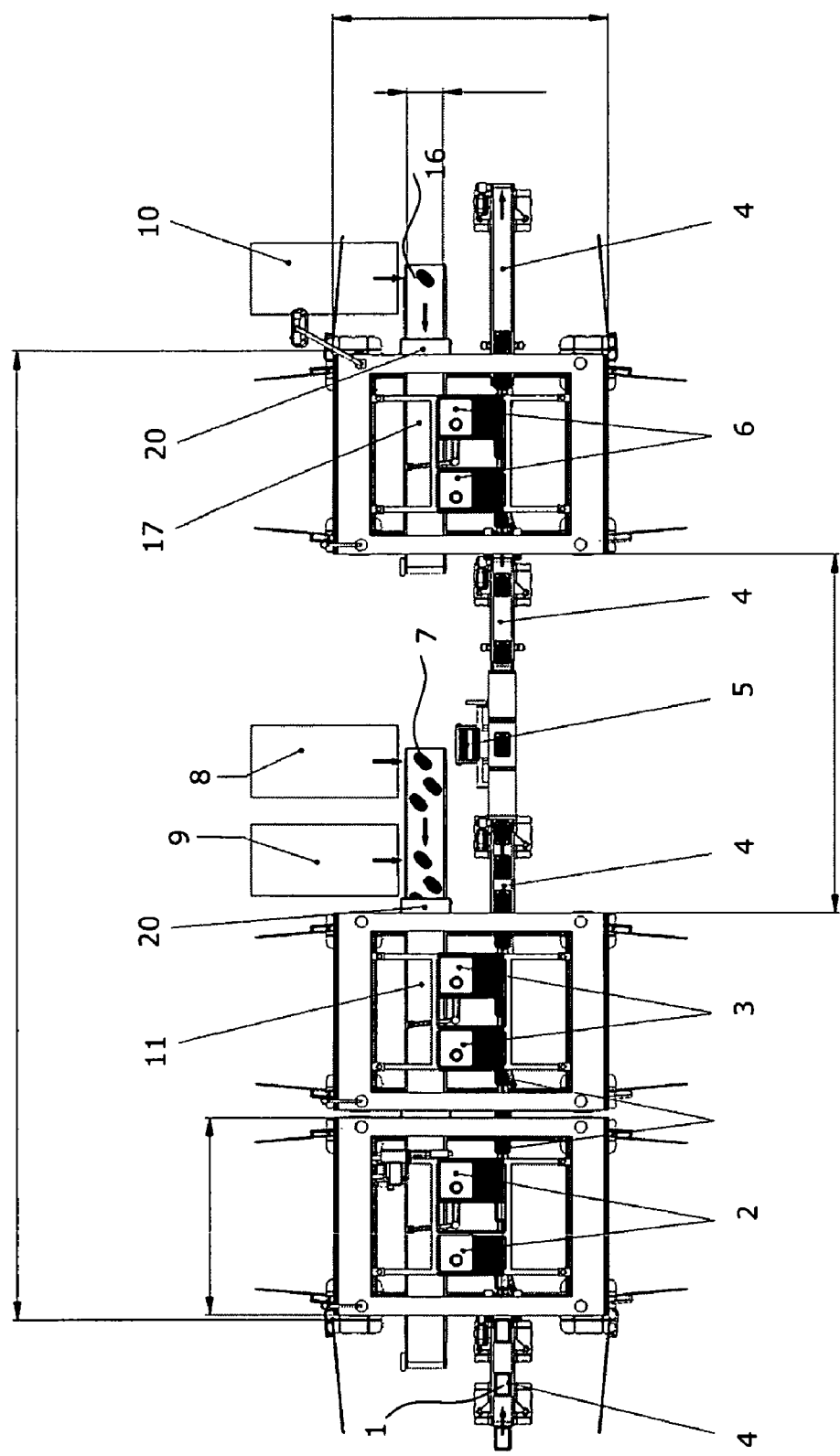

FIG. 1 illustrates a device for consolidating a number n of items in containers 1 with two first insertion stations 2 and 3, a conveyor 4, a scale 5, and a second insertion station. FIG. 2 illustrates the device in plan view. In this representation, additional individual items 7, as well as the three portioning and cutting devices 8, 9 and 10, can be seen.

The two portioning and cutting devices 8 and 9 slice off single slices with a desired and pre-defined slice weight from a larger piece of meat, which is not shown in the drawing. The actual weight of each of the slices can vary within a range. The slices are items 7, which are to be consolidated in individual containers 1. Using a conveyor 11, the items 7 are supplied to two first insertion stations 2 and 3. A scanner 20 registers the position of the items 7 on the conveyor and transmits this information to the two insertion stations. The two insertion stations are provided with two gripper arms 12 and 13, as well as 14 and 15. Each of the gripper arms is mounted above the conveyor 4 for the containers 1 and the conveyor 11 for the items 7. Moreover, each gripper arm is equipped with a gripper, which is not visible in the drawing. The grippers pick up the items conveyed on the conveyor 11 and insert them into the containers. In the embodiment, each container is to be filled with a total of five slices. The two first insertion stations 2 and 3 fill a total of four items into each container 1.

The conveyor 4 moves the containers 1 to the right. The conveyor 11 moves the items 7 to the left. The containers 1 which are each filled with four items 7 are conveyed with the conveyor 4 to the scale 5. In this instance, the scale is an in-line checkweigher. It determines the weight of each container 1 filled with four items. Thereafter, a computer (not shown in the drawing) determines the difference between the target weight of the five items and the container on the one hand, and the weight of one container 1 filled with four items that has been measured by the scale, on the other. The difference corresponds to the weight of the fifth slice which must still be filled into the container. Subsequently, the portioning and cutting device 10 is adjusted such that a slice having the exactly determined weight is cut off from the larger piece of meat, which is not visible in the drawing. This item 16 is subsequently conveyed by a conveyor 17 to a second insertion station 6. A scanner 20, which is provided on the conveyor 17, registers the position of the item 16, and transfers the information to the insertion station 6. The second insertion station 6 is equipped with two gripper arms 18 and 19 and with grippers that are not visible in the drawing. One of the two gripper arms 18 or 19 picks up the item 16 and inserts it into the associated container 1. Thus, the container is completely filled and is then conveyed for further processing.

Figure 3:
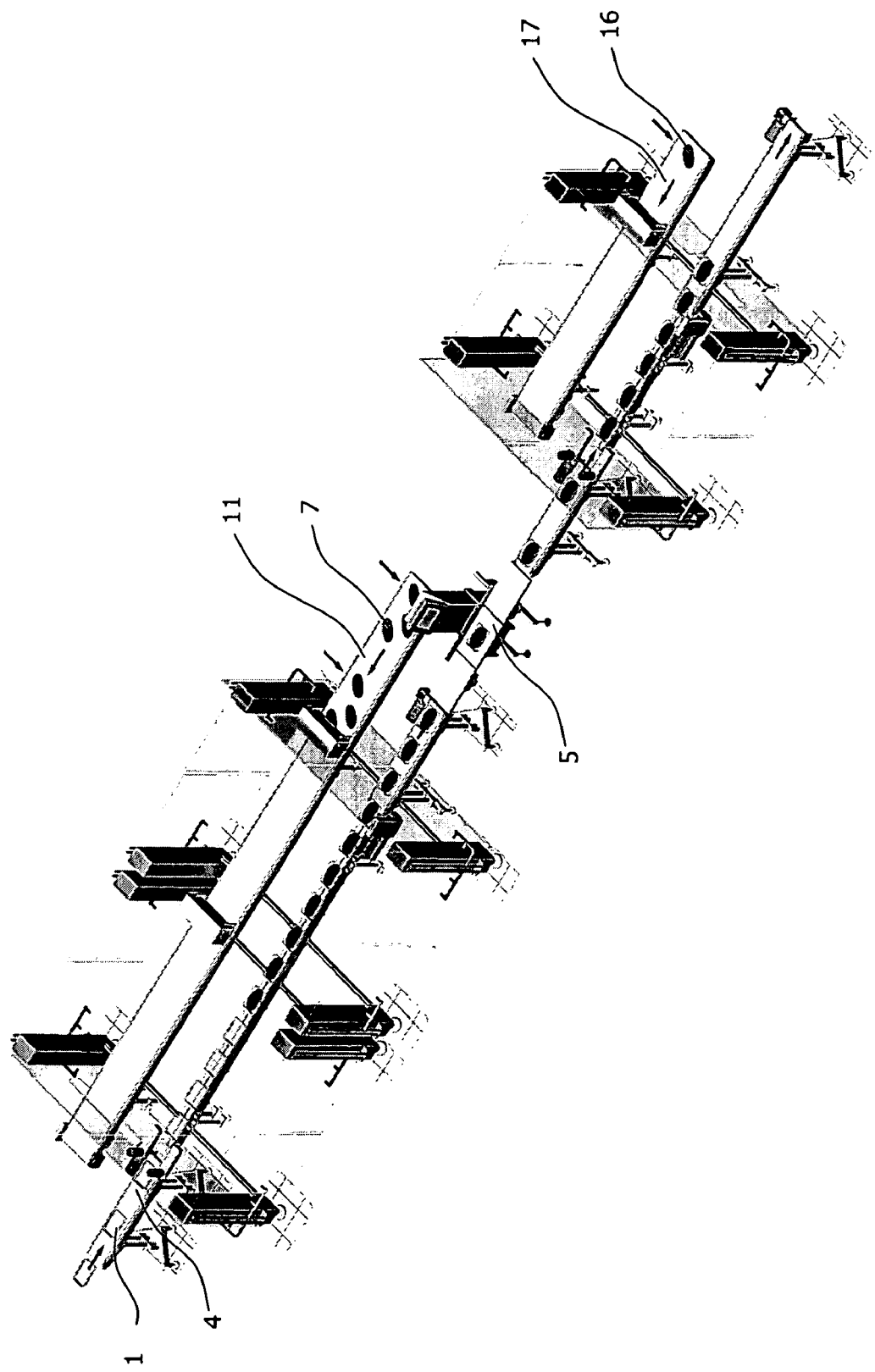

FIG. 3 illustrates the device in a perspective representation without the two first insertion stations 2 and 3, the second insertion station 6, and the portioning and cutting devices 8, 9 and 10.

All features of the invention, either individually or in any given combination, can be essential to the invention.

The invention claimed is:

1. A device for analyzing and dividing from one or two unitary pieces of animal flesh N number of unitary portions, the sum of which individual weights meet a predetermined target weight, the target weight being above the sum total weight of the number N−1 portions, a portion number N being cut from one of the unitary pieces, the weight of portion number N when added to the N−1 portions equaling the target weight, comprising:
   at least one portioning and cutting unit for portioning and cutting one or two unitary pieces of animal flesh into N portions;
   a first insertion station for mechanized selection and combination of N−1 portions and for insertion into a container;
   a conveyer for conveying at least the N−1 portions,
   a scale for determining the weight of the portions;
   a computer for determining a difference between the target weight of the N portions and the sum total weight of the N−1 portions, and for establishing the required weight of the number N portion, and for at least partially controlling the portioning and cutting unit;
   a controller which controls and adjusts the portioning and cutting unit to cut off from one of the unitary pieces of animal flesh the unitary number N portion having a calculated predetermined weight, the weight of the unitary number N portion equal to the weight difference established by the computer between the target weight and the sum total weight of the N−1 portions; and
   a second insertion station for mechanized filling into the container at least the unitary number N portion, whereby the target weight is accurately achieved.

2. Device as in claim 1, wherein the scale is provided on the conveyor, and that the scale is an in-line checkweigher.

3. Device as in claim 1, wherein the first and/or second insertion station is equipped with one or more grippers which pick up the items in a sequence in which they are supplied and insert them into a container.

4. Device as in claim 3, wherein the grippers are needle grippers, finger grippers, or shovel grippers.

5. Device as in claim 3, wherein the grippers are suction grippers, which are based either on creating a vacuum or using the venturi jet principle.

6. Device as in claim 3, wherein the gripper is arranged on a rotating gripper arm, whose rotational axis runs perpendicular to the direction of motion of the conveyor, in that a gripper arm drive for rotating the gripper arm is provided, in that a plate is provided on which an item supplied on the conveyor is pushed by the gripper, and which guides the item to the pre-determined position in the container, and in that a plate drive is provided for rotating the plate around an axis between a first position directly on the conveyor and a second position above the container.

7. Device as in claim 6, wherein the gripper has two fingers and that one of the two fingers is connected to the gripper arm such that it can be shifted in a radial direction or varied and that the other finger is firmly attached on the gripper arm.

8. Device as in claim 3, wherein the gripper is arranged on one gripper arm, the end of which that is facing away from the gripper is attached above the conveyor such that it is firmly in place or shiftable or rotatable, and that the gripper arm is movable around at least two axes.

9. Device as in claim 1, wherein a sensor for detecting a supplied item is provided on the conveyor.

10. Device as in claim 9, wherein the sensor is an electronic camera.

11. Device as in claim 1, wherein the first and/or the second insertion station is provided with an industrial robot.

12. Device as in claim 1, characterized in that the portioning and tracking device is provided with:
   at least one elongated insertion chamber for inserting a large piece;
   a piston which can be inserted axially from one end into the insertion chamber for compressing the piece in the insertion chamber and for advancing it axially incrementally or continuously;
   a portioning unit which can be rotated around its axis and is arranged on the end of the insertion chamber facing away from the piston;
   one or more portioning chambers in the portioning unit;
   one chamber floor which is movably arranged on the side of the portion chamber that is facing away from the insertion chamber;
   a mechanical gear unit or an electromotive, electric or hydraulic drive for the chamber floor; and
   a knife, which is movably located between the insertion chamber and the portioning unit, for cutting off the section of the piece located in the portioning chamber.

13. Device as in claim 12, wherein a further gear unit or a further drive is provided for the chamber floor, which retracts the chamber floor while the knife is cutting in order to relieve the load from the knife, and which after the cutting and the release of the portioning chamber advances the chamber floor in order to eject the item located in the portioning chamber.

14. Device as in claim 1, wherein a second scale is provided downstream of the second insertion station, and that a control unit is provided which compares the weight of the container with the number N of items to the target weight and which in case of a deviation that is outside of the tolerance range appropriately corrects the adjustment of the portioning and cutting device.

15. Device as in claim 1, wherein upstream of the first insertion station, one or more portioning and cutting devices are provided for cutting off precise weights of items from a larger piece.

16. Device as in claim 15, wherein upstream of the portioning and cutting device which is arranged upstream of the first insertion station, a scale for determining the weight of the piece to be cut into individual items is provided, that a computer is provided for calculating the integer numbers of items of a weight within predefined limits that can be cut off from the piece from the weight of the piece that is measured by the scale, and for calculating the associated weight of each item, and that a control unit is provided for adjusting the portioning and cutting device for cutting off the items with the calculated weight from the piece.

17. Device as in claim 1, wherein a control unit is provided for controlling a mechanical insertion device of the first and/or second insertion station as a function of the position of the items on the conveyor.

* * * * *